United States Patent [19]

Kamata et al.

[11] Patent Number: 4,664,154
[45] Date of Patent: May 12, 1987

[54] REED VALVE

[75] Inventors: Yoshikiyo Kamata, Hachioji; Takashi Fukuoka, Fuchu, both of Japan

[73] Assignee: Kioritz Corporation, Tokyo, Japan

[21] Appl. No.: 708,538

[22] Filed: Mar. 5, 1985

[30] Foreign Application Priority Data

Mar. 9, 1984 [JP] Japan .................. 59-33909[U]

[51] Int. Cl.[4] .............................. F16K 15/16
[52] U.S. Cl. ................. 137/857; 137/512.15; 123/73 V
[58] Field of Search ............... 137/512.15, 512.4, 855, 137/856, 857, 858; 123/73 R, 73 A, 73 V

[56] References Cited

U.S. PATENT DOCUMENTS

| 36,863 | 11/1862 | Serrell | 137/857 |
| 724,641 | 4/1903 | Wiki | 137/512.15 |
| 1,707,306 | 4/1929 | Holdsworth | 137/857 X |
| 2,000,883 | 5/1935 | Cullen et al. | 137/857 X |
| 2,118,356 | 5/1938 | Money | 137/856 |
| 2,689,552 | 9/1954 | Kiekhaefer | 123/73 V |
| 2,739,581 | 3/1956 | Garrett | 123/73 V X |
| 3,200,838 | 8/1965 | Sheaffer | 137/512.15 |
| 4,051,820 | 10/1977 | Boyesen | 123/73 A |
| 4,257,458 | 3/1981 | Kondo et al. | 137/512.15 X |

FOREIGN PATENT DOCUMENTS

| 836186 | 1/1939 | France | 137/857 |
| 55-24276 | 2/1980 | Japan | |
| 165237 | 11/1933 | Switzerland | 137/856 |
| 2112856 | 7/1983 | United Kingdom | 123/73 A |

Primary Examiner—Samuel Scott
Assistant Examiner—Noah Kamen
Attorney, Agent, or Firm—Browdy and Neimark

[57] ABSTRACT

A reed valve includes a main reed member and an auxiliary reed member which is overlaid on the outside surface of the main reed valve. The auxiliary reed member has a smaller length than that of the main reed member. The width of the auxiliary reed member is gradually decreased from its fixed end to its free end.

4 Claims, 3 Drawing Figures

REED VALVE

BACKGROUND OF THE INVENTION

The present invention relates to a reed valve for use in an intake system communicating with a crankcase of a two-cycle interval combustion engine.

A reed valve of the type described above has heretofore been known in which a plurality of reeds are provided which are made different from each other in their mounting positions or in their structures for the purpose of maintaining at a substantially uniform level the overall performance of the reed valve at engine speeds ranging from low speed to high speed. In such a reed valve, however, no consideration has been given to improvements in performance of each individual reed. In consequence, the natural frequency, that is, the point of resonance, of the reeds is unfavorably low, so that the reeds may flutter during operation, which fact involves adverse effects on the engine performance and a disadvantageously short lifetime of the reeds.

SUMMARY OF THE INVENTION

It is a primary object of the present invention to overcome the above-described disadvantages of the prior art and to provide a reed valve which has a simple and convenient structure.

To this end, according to the invention, there is provided a reed valve for use in an intake system communicating with a crankcase of a two cycle internal combustion engine, which comprises: a valve body formed with a communicating bore for passing intake air into the crankcase; a main reed member having one end thereof fixed to the downstream-side surface of the valve body and extending such as to close the communicating bore; and an auxiliary reed member overlaid on the outside surface of the main reed member and having one end thereof fixed at the fixed end of the main reed member, the auxiliary reed member being formed such that it has a smaller length than that of the main reed member and a width which is gradually decreased from its fixed end to its free end which is bent outwardly.

Thus, according to the arrangement of the present invention, the auxiliary reed member is provided in such a manner as to be overlaid on the outside surface of the main reed member and is formed such that it has a smaller length than that of the main reed member and a width which is gradually decreased from the fixed end to the free end thereof. It is, therefore, possible to increase the natural frequency, that is, the point of resonance, of the reed valve without lowering its performance at low speeds, so that it is possible to increase the speed and the acceleration performance of the engine. Further, combined with the formation of the auxiliary reed valve with its free end bent outwardly, dispersion of stress allows the lifetime of the reed valve to be greatly extended. Moreover, the reed valve has an advantageously a simple structure and is easily manufactured.

The above and other objects, features and advantages of the present invention will become clear from the following description of the preferred embodiment thereof, taken in conjunction with the accompanying drawings.

DESCRIPTION OF THE PREFERRED EMBODIMENT

The present invention will be described hereinunder through one embodiment with reference to the accompanying drawings.

Figure 1:
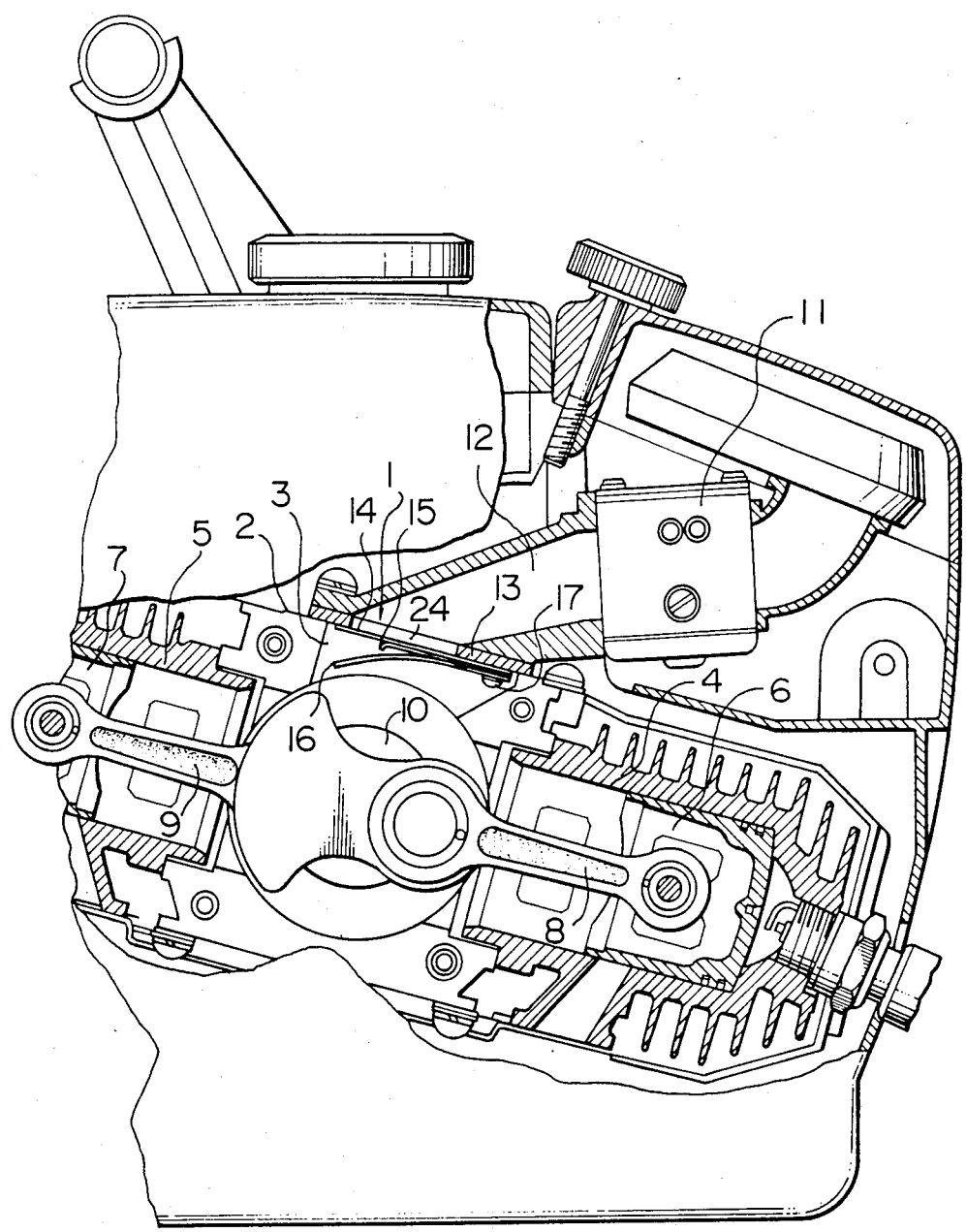
FIG. 1 is a sectional view of an essential portion of a horizontally opposed two-cylinder two-cycle internal combusion engine which incorporates the reed valve according to the present invention.

Referring first to FIG. 1 which shows an essential portion of a horizontally opposed two-cylinder two-cycle internal combusion engine which incorporates a reed valve 1 according to the present invention, this engine is mounted on a portable chain saw. The engine includes an engine body 2 which has a crankcase 3 formed in its center. A pair of cylinders 4, 5 are disposed on both sides of the crankcase 3 in opposed relation to each other. Pistons 6, 7 are reciprocatably provided in the respective cylinders 4, 5. The engine further includes connecting rods 8, 9. One end of the connecting rod 8 is pivotally connected to the piston 6, while one end of the connecting rod 9 is pivotally connected to the piston 7. In addition, a rotating output shaft 10 is rotatably provided inside the crankcase 3. To the output shaft 10 are pivotally connected the respective other ends of the connecting rods 8, 9 at eccentric positions which are 180° out of phase from each other. The crankcase 3 is supplied with a air-fuel mixture from a carburetor 11 through a duct 12 and the reed valve 1.

The reed valve 1 has a flat plate-shaped valve body 13 secured to the engine body 2. The valve body 13 has a pair of communicating bores 24 formed therein side by side for providing communication between the respective insides of the duct 12 and the crankcase 3. The reed valve 1 further has a main reed member 14, an auxiliary reed member 15 and a stopper member 16 which are overlaid one upon another in the mentioned order and are fixed together by pins 17 to the surface of the valve body 13 on the side thereof which is closer to the crankcase 3, that is, the downstream-side surface of the valve body 13. The stopper member 16 is curved in such a manner that the portion of the stopper member 16 on the side thereof which is closer to its free end is located inward of the other end portion at which the stopper member 16 is fixed to the valve body 13 by the pins 17, whereby the respective extermities of opening of the reed members 14, 15 are limited by the stopper member 16.

Figure 2:
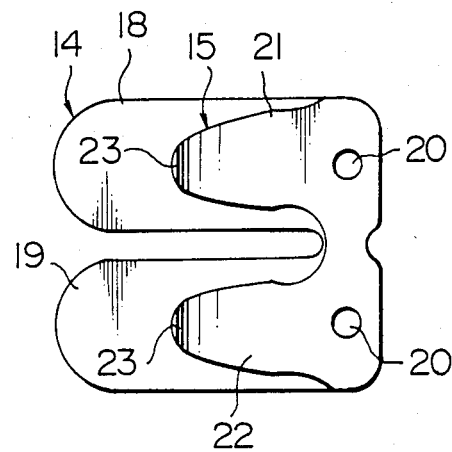
FIG. 2 is a plan view of reed members employed in the reed valve shown in FIG. 1.

The main reed member 14, as shown in FIG. 2, has a pair of reed pieces 18, 19 which extend in parallel to each other. The reed pieces 18, 19 are integrally connected together at the end portion of the main reed member 14 at which are formed bores 20 for receiving the respective pins 17. The reed pieces 18, 19 are arranged such that their intermediate portions are employed to close the respective communicating bores 24 formed in the valve body 13.

Figure 3:
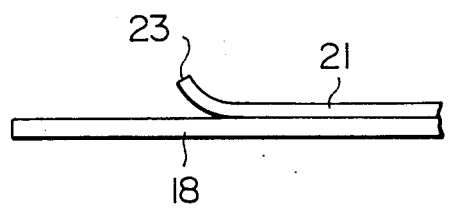
FIG. 3 is a partially cutaway side elevational view of the reed members shown in FIG. 2.

The auxiliary reed member 15 has reed pieces 21, 22 which are overlaid on the respective reed pieces 18, 19 of the main reed member 14. The reed pieces 21, 22 are integrally connected together at the end portion of the auxiliary reed member 15 at which are formed the bores 20 for receiving the respective pins 17. The reed pieces 21, 22 of the auxiliary reed member 15 are smaller in length than the reed pieces 18, 19 of the main reed member 14. In addition, each of the reed pieces 21, 22 is gradually decreased in width toward its free end 23. Further, as shown in FIG. 3, the respective free ends 23 of the reed pieces 21, 22 are bent outwardly, that is, in a direction in which they are away from the corresponding reed pieces 18, 19 of the main reed member 14. The angle of this bending is preferably larger than 45 degrees. Thus, it is possible to greatly extend the lifetime of the reed valve.

Although the invention has been described through specific terms, it is to be noted here that the described embodiment is not exclusive and various changes and modifications may be imparted thereto without departing from the scope of the invention which is limited solely by the appended claims.

What is claimed is:

1. A reed valve for use in between an intake system communicating with a crankcase of a two-cycle internal combustion engine comprising:

a valve body formed with a communicating bore for passing an air fuel mixture into the crankcase;

a main reed member attached to a downstream side of said valve body facing the crankcase and with said main reed member having a fixed end at which said main reed member is fixed to said valve body;

said main reed member dimensioned to cover said communicating bore and having a generally constant width;

an auxiliary reed member attached to said main reed member at said fixed end of said main reed member and with said auxiliary reed member on a surface of said main reed member facing toward the crankcase;

said auxiliary reed member extending away from said fixed end at which said auxiliary reed member is attached to said main reed member in the same direction and for a lesser distance than the extension of said main reed member from said fixed end;

said auxiliary reed member having a gradually decreasing width in a direction that said auxiliary reed member extends from said fixed end at which said auxiliary reed member is attached to said main reed member;

said auxiliary reed member having a free end at an opposite end from which said auxiliary reed member is attached to said main reed member with said free end being bent outwardly away from said main reed member;

said auxiliary reed member having a surface in contact with an adjacent surface of said main reed member;

said surfaces contacting each other from where said auxiliary reed member is attached at said fixed end of said main reed member and maintaining such contact to substantially a center of said communicating bore where said free end of said auxiliary reed member is bent outwardly away from surface contact with said main reed member.

2. A reed valve according to claim 1, wherein the angle of said bending of said free end of said auxiliary reed member is larger than 45 degrees.

3. A reed valve according to claim 2, further comprising a stopper member attached on a side of said auxiliary reed member away from said main reed member;

and a pin fixing said main reed member, said auxiliary reed member, and said stopper member to said valve body.

4. A reed valve according to claim 1, further comprising a stopper member attached on a side of said auxiliary reed member away from said main reed member;

and a pin fixing said main reed member, said auxiliary reed member, and said stopper member to said valve body.

* * * * *